US011510367B2

(12) United States Patent
Bell et al.

(10) Patent No.: US 11,510,367 B2
(45) Date of Patent: Nov. 29, 2022

(54) DRAPER HEADER FOR A CROP HARVESTING MACHINE (71) Applicant: MacDon Industries Ltd., Winnipeg (CA)

(72) Inventors: Andrew Bell, Sanford (CA); Bruce Shearer, Winnipeg (CA)

(73) Assignee: MACDON INDUSTRIES LTD., Winnipeg (CA)

( * ) Notice: Subject to any disclaimer, the term of this patent is extended or adjusted under 35 U.S.C. 154(b) by 142 days.

(21) Appl. No.: 16/832,057

(22) Filed: Mar. 27, 2020

(65) Prior Publication Data
US 2020/0359564 A1 Nov. 19, 2020

Related U.S. Application Data
(60) Provisional application No. 62/846,976, filed on May 13, 2019.

(51) Int. Cl.
*A01D 61/00* (2006.01)
*A01D 41/14* (2006.01)
(52) U.S. Cl.
CPC ......... *A01D 61/006* (2013.01); *A01D 61/004* (2013.01); *A01D 41/14* (2013.01)
(58) Field of Classification Search
CPC .... A01D 61/004; A01D 61/006; A01D 41/14; A01D 57/20
See application file for complete search history.

(56) References Cited

U.S. PATENT DOCUMENTS

| 5,464,371 | A | * | 11/1995 | Honey | A01D 41/14 460/20 |
| 6,865,871 | B2 | * | 3/2005 | Patterson | A01D 57/20 56/14.5 |
| 7,392,646 | B2 | * | 7/2008 | Patterson | A01D 61/008 198/613 |
| 2002/0129591 | A1 | * | 9/2002 | Patterson | A01D 57/20 56/158 |
| 2007/0193243 | A1 | * | 8/2007 | Schmidt | A01D 57/20 56/181 |
| 2014/0298765 | A1 | * | 10/2014 | Fuechtling | A01D 57/20 56/10.2 R |
| 2015/0208582 | A1 | * | 7/2015 | Patterson | A01D 61/008 460/20 |
| 2018/0054964 | A1 | * | 3/2018 | Fuchtling | A01D 61/008 |
| 2019/0029177 | A1 | * | 1/2019 | Enns | A01D 41/14 |

(Continued)

Primary Examiner — Alicia Torres
Assistant Examiner — Matthew Ian Neal
(74) Attorney, Agent, or Firm — Miller Canfield (57) ABSTRACT Crop is carried into a feed opening of a harvester by two side drapers, two rear back sheets defining an opening between inner edges, a central feed draper and a roller with end flight portions and a central finger portion located above the feed draper. In this geometry, a bottom tangent to the flight portions has a position which is at a height below the rear edge of the side drapers. The roller axis of the feed roller is behind the rear edge of the side drapers and behind a common plane containing the back sheets. The inner guide roller of each of the first and second side drapers is located inwardly of the inner edge of the first back sheet and inwardly of an outer end of the end flight portion. A forward most tangent to the flight portions projects forward of or proud of the common back sheet plane.

9 Claims, 5 Drawing Sheets (56) References Cited

U.S. PATENT DOCUMENTS

2019/0029181 A1\* 1/2019 Modak ................. A01D 41/142
2019/0200525 A1\* 7/2019 MacMillan .......... A01D 61/006
2020/0000037 A1\* 1/2020 Washburn .............. A01D 41/14
2020/0229347 A1\* 7/2020 Lyons ................. A01D 61/006

\* cited by examiner

DRAPER HEADER FOR A CROP HARVESTING MACHINE

This application claims the benefit under 35 USC 119 (e) from Provisional Application 62/846,976 filed May 13, 2019.

This invention relates to a draper header for a crop harvesting machine and more particularly to the geometry of a feed draper, side drapers, back sheet and feed roller relative to a feed opening of the harvesting machine.

BACKGROUND OF THE INVENTION

In U.S. Pat. No. 4,956,966 issued September 1990 and U.S. Pat. No. 5,005,343 issued April 1991 by Patterson and assigned to the present Assignee is disclosed a header which utilizes two side drapers to transport the crop cut by the knife inwardly along the header table to a central discharge opening. The side drapers discharge onto a central feed draper which has a front roller just behind the knife and a rear roller at the feeder house of a combine harvester so as to carry the crop from the side drapers rearwardly into the feeder house for inlet into the combine harvester for processing. A rotary feed member or roller which typically carries end auger flight portions and a central finger portion is mounted at the discharge opening of the header above the feed draper so as to assist in carrying bulky crop through the discharge opening so as to be carried into the feeder house. The feed draper is carried on the rear roller which is attached to a feeder house and therefore the feed draper and its associated underlying pan flex and twist as the header floats relative to the feeder house.

While this arrangement has achieved considerable commercial success, it is desirable to improve the feed of the crop material from the side drapers into the feeder house particularly in relation to bulky crops such as canola.

A subsequent U.S. patent which is U.S. Pat. No. 5,454,371 issued November 1995 by Honey discloses a similar arrangement in which the crop is transferred from the rear end of the feed draper into a rigid fixed adapter housing which is mounted on the front of the feeder house and contains the rotary feed member in the form of an auger with conventional feeding fingers. This arrangement therefore requires that the header is moved forwardly relative to the feeder house so as to provide the space necessary for the adapter housing and its rotary feed member contained therein.

In both patented arrangements there is significant difficulty in ensuring that the crop is effectively carried from the side drapers for transfer from the side drapers onto the feed draper and under the feed roller into the feed opening to move rearwardly into the feeder house.

While the present invention is primarily designed for use with a header of the above type for feeding the crop into the combine harvester, the same arrangement as described in detail hereinafter can also be used in other harvesting machines with a feed opening.

One example of a header with which this arrangement can be used is in WO 2018/094512 by the present applicant published 31 May 2018. The disclosures of each of the patent documents cited herein are incorporated herein by reference.

SUMMARY OF THE INVENTION

It is one object of the present invention to provide a header in which the system for transfer of crop from the side drapers to the feeder house is improved.

According to the invention there is provided a crop harvesting header for a harvester comprising:

a main frame structure extending across between two ends of the header across a width of the header for movement in a direction generally at right angles to the width across ground including a crop to be harvested;

a mounting assembly for carrying the main frame structure on the harvester;

a cutter bar across a front of the main frame structure carrying a cutter knife operable for cutting the crop as the header is moved forwardly across the ground;

and a crop transport system for moving the cut crop toward a discharge location of the header for feeding the crop into a feed opening of the harvester;

the crop transport system including:

a first side draper having an outer end guide roller at a first end of the header, an inner end guide roller adjacent the discharge location and a draper canvas to define a top run of the canvas for carrying the cut crop from the cutter knife across the header to a discharge end adjacent the discharge location;

a second side draper having an outer end guide roller at a second end of the header, an inner end guide roller adjacent the discharge location and a draper canvas to define a top run of the canvas for carrying the cut crop from the cutter knife across the header to a discharge end adjacent the discharge location;

a feed draper located at the discharge location and including a front guide roller adjacent the cutter bar, a rear guide roller behind the front guide roller and a draper canvas wrapped around the front and rear guide rollers to define a top run of the feed draper for receiving the crop material from the discharge ends of the first and second side drapers and for carrying the crop material rearwardly toward the feed opening of the harvester;

each of the first and second side drapers having a front edge at the cutter bar and a rear edge;

and a feed roller having a main drum rotatable about a roller axis generally parallel to the cutter bar, the drum including a finger section at a center portion adjacent the feed opening and first and second auger flight portions arranged on respective end portions of the main drum outwardly of the finger section;

the main frame structure including first and second back sheets each having a bottom edge at the rear edge of a respective one of the first and second side drapers, with each of the first and second back sheets extending upwardly and rearwardly from the bottom edge in a common back sheet plane;

the first and second back sheets having an inner edge thereof spaced on a respective side of the feed opening to define an opening between the back sheets through which the crop passes to the feed opening of the harvester;

wherein a bottom tangent to the bottom of the flight portions has a position which is at a height below the rear edge of the side drapers;

wherein the roller axis of the feed roller is behind the rear edge of the side drapers and behind the back sheet;

wherein the inner end guide roller of the first side draper is located inwardly of the inner edge of the first back sheet and inwardly of an outer end of the first auger flight portion;

wherein the inner end guide roller of the second side draper is located inwardly of the inner edge of the second back sheet and inwardly of an outer end of the second auger flight portion;

and wherein a forward most tangent to the flight portions is forward of the common back sheet plane.

Preferably the forward most tangent is rearward of the rear edge of the first and second side drapers.

Preferably the rear roller of the feed draper is behind the rear edge of the first and second side drapers.

Preferably the rear roller of the feed draper is in a vertical plane at or slightly in front of the roller axis. That is typically the rear feed draper roller is ahead of the roller axis. However it is also possible that the feed draper extends all the way to the feederhouse.

Preferably a tangent to the flight portions is immediately adjacent the rear edge of the side drapers. However there may be a space between the rear edge and the flight portions provided the tangent to the flight portions is forward of or proud of the plane of the backsheets.

Preferably the main drum is coaxial about the roller axis. However it can include end portions where the axis of the end flight portion is different from an axis of the center finger portion.

Preferably the main drum is of a constant diameter about the roller axis. However it may have sections which are of a different diameter so that the drum is stepped.

Preferably an exterior edge of the first and second auger flight portions lie in a common imaginary cylindrical surface surrounding the roller axis. However the flights may be tapered so that parts are of a different diameter. As is well known, the fingers are mounted eccentrically and with an operating mechanism which causes them to move inwardly and outwardly of the drum at different angular positions around the axis of the drum so as to assist in picking up crop in front of the drum and to discharge that crop behind the drum. Many disclosures of an arrangement of this type are available.

The arrangement defined above preferably provides a situation where the feed draper has a width substantially equal to the width of the feed opening and the feed roller including the first and second auger flight portions thereon is wider than the feed opening. The construction thus helps in brining the crop inwardly to the feed opening to avoid bunching and clogging of the crop material in this critical area.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

The header shown in the figures comprises a main frame 10 including a horizontal main support beam 11 extending along the length of the header along a first end to a second end of the header. The main frame includes forwardly extending frame members at the ends of the header together with similarly arranged frame members intermediate the width of the header. These details are not shown as they are well known. At the front end of the frame members is mounted a cutter bar 15 which carries a sickle knife construction of a conventional nature. The frame 10 is attached to an adapter structure 16 attached to the feeder house 17 of a combine harvester. The feeder house 17 defines a feed opening having a width 17A and a height 17B at a mouth of the feeder house.

The header includes a crop transportation system for transferring the crop from the sickle knife to the feeder house. This includes two side drapers 19 and 20 each of which includes a canvas extending from an outer guide roller to an inner guide roller 22 so as to define an upper run of the canvas which carries the crop inwardly toward the center of the header.

At the center of the header is provided a feed draper 23 which has a front roller 24 just behind the cutter bar and a rear roller 25 thus defining an upper run 23A of the canvas which carries the crop rearwardly toward the feeder house 17.

The main frame structure includes first and second back sheets 38, 39 each having a bottom edge 38A, 39A at the rear edge of a respective one of the first and second side drapers 20, 21, with each of the first and second back sheets extending upwardly and rearwardly from the bottom edge in a common back sheet plane. The first and second back sheets having an inner edge 40, 41 thereof spaced on a respective side of the feed opening of the harvester to define an opening 43 between the back sheets through which the crop passes to the feed opening of the feeder house 17 of the harvester. The back sheets 38, 39 are typically a metal panel which prevents crop from escaping rearwardly with the back sheets extending from the inner edge at the feed opening to the outer end of the header. In rigid headers, the back sheets are continuous. In hinged headers the back sheets are broken at the hinge point to allow the wings to flex.

A feed roller 30 at the feed opening includes a main drum 31 rotatable about a roller axis 32 generally parallel to the cutter bar. The drum includes a finger section 33 at a center portion adjacent the feed opening and first and second auger flight portions 34, 35 arranged on respective end portions of the main drum outwardly of the center finger section. The roller comprises a cylindrical drum typically of constant diameter and coaxial to the roller axis with the finger structure movable inwardly and outwardly of the drum as is well known in a finger pattern operable to help the material into the feed opening. The auger flight portions at the ends include auger flights 36 and 37 with outer edges lying in a common cylindrical shape coaxially surrounding the roller axis.

Thus the header includes the main frame structure 11 extending across between two ends of the header across a width of the header for movement in a direction generally at right angles to the width across ground including a crop to be harvested. In some cases the header is rigid so that there are no flexible hinge couplings along its length. In other cases the header can be of the flexing wing type typically including a center section attached to the harvester and two wing sections which are coupled to the center section to hinge upwardly and downwardly about axes generally parallel to the direction of movement. Each of the first and second side drapers has a front edge at the cutter bar 15 and a rear edge adjacent the bottom edge of the back sheet 38, 39. The cutter bar itself can be rigid or can flex to follow ground contours. All of these options are well known and incorporated herein.

Headers of the general type described above are well known and the area with which the present invention is concerned is that of the feed section at the center of the header which carries the crop from the inner ends of the side drapers into the feeder house.

Figure 2:
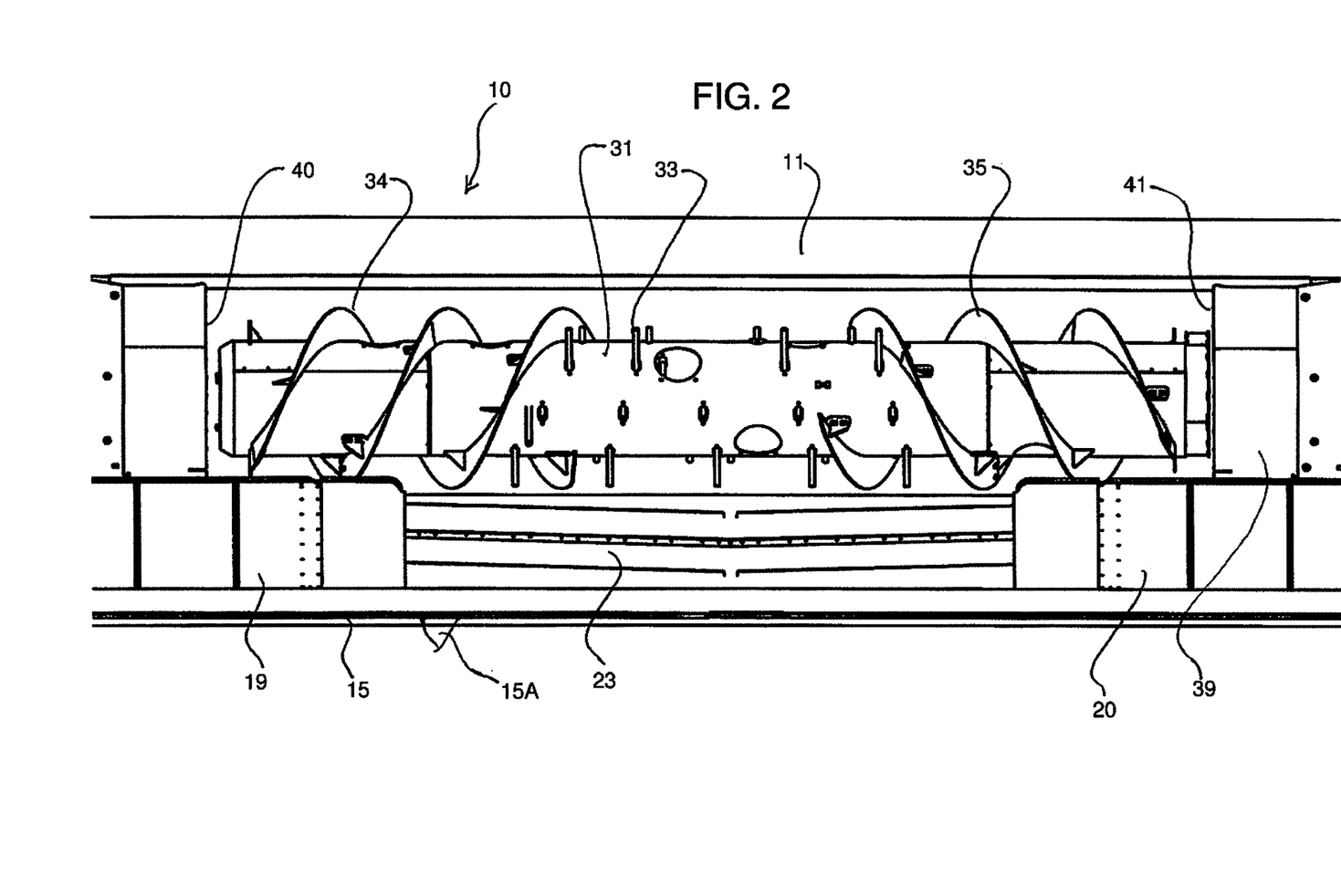
FIG. 2 is a front elevational view of the header of FIG. 1.
Figure 3:
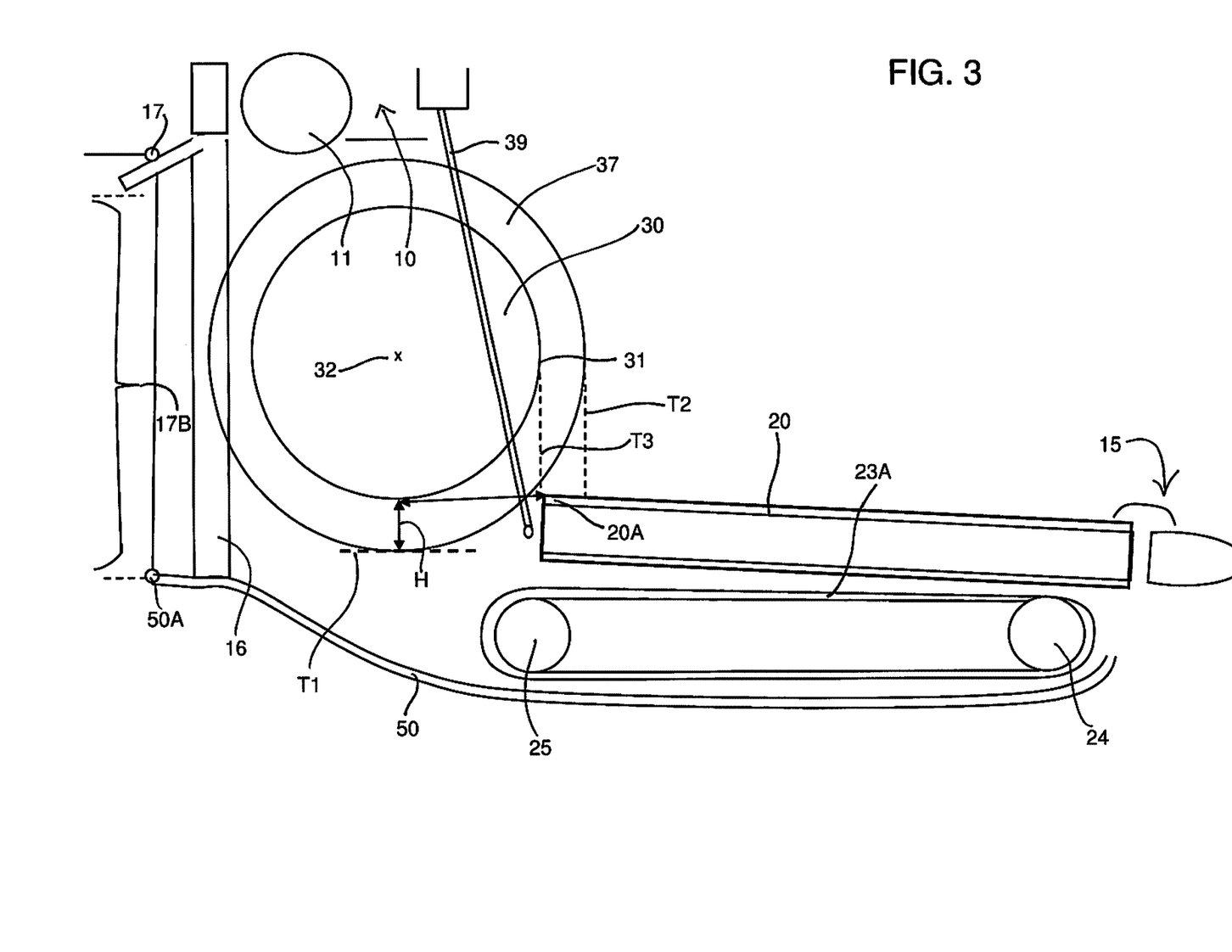
FIG. 3 is a cross sectional view along the lines 2-2 of the header of FIG. 1.

The present invention relates to a particular geometry of inner edges of the back sheets, the feed roller and the side drapers. In this arrangement, as best shown in FIGS. 2 and 3, the bottom tangent T1 to the bottom of the flight portions 37 has a position of operation which is at a height H below the rear edge 20A of the side drapers 19, 20. The roller may float upwardly from this position to allow bulky crop to pass or may be fixed in height. The height of the rear edge 20A can be approximately aligned with a tangent to the bottom of the drum 31. However the height of the rear edge of the side draper 20A is typically higher than the bottom tangent of the feed drum.

In this geometry as shown in FIG. 3, the roller axis 32 of the feed roller is behind the rear edge 20A of the side drapers and behind the back sheets 38, 39 and the common plane thereof.

Figure 4:
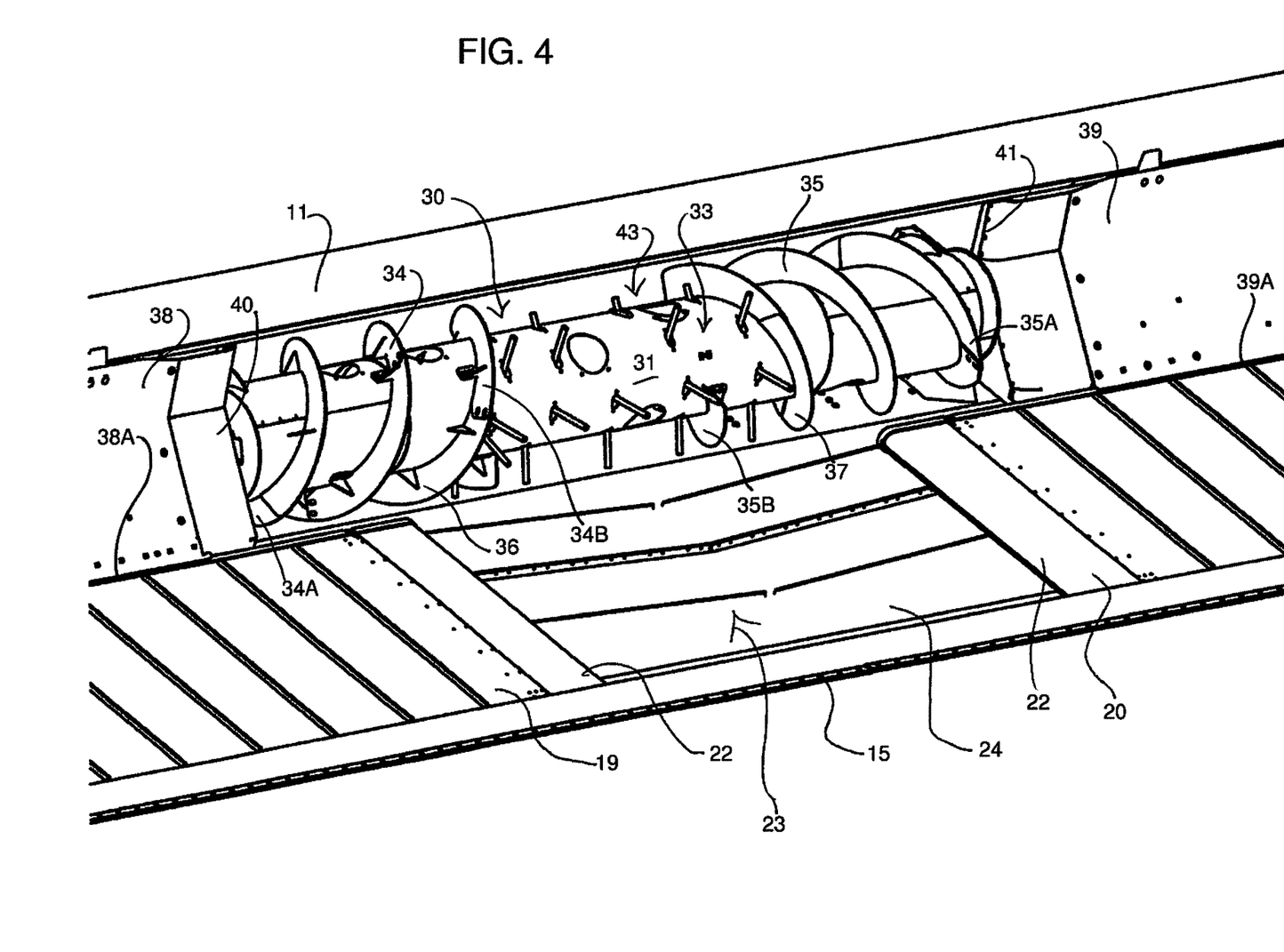
FIG. 4 is a first isometric view along the header of FIG. 1.
Figure 5:
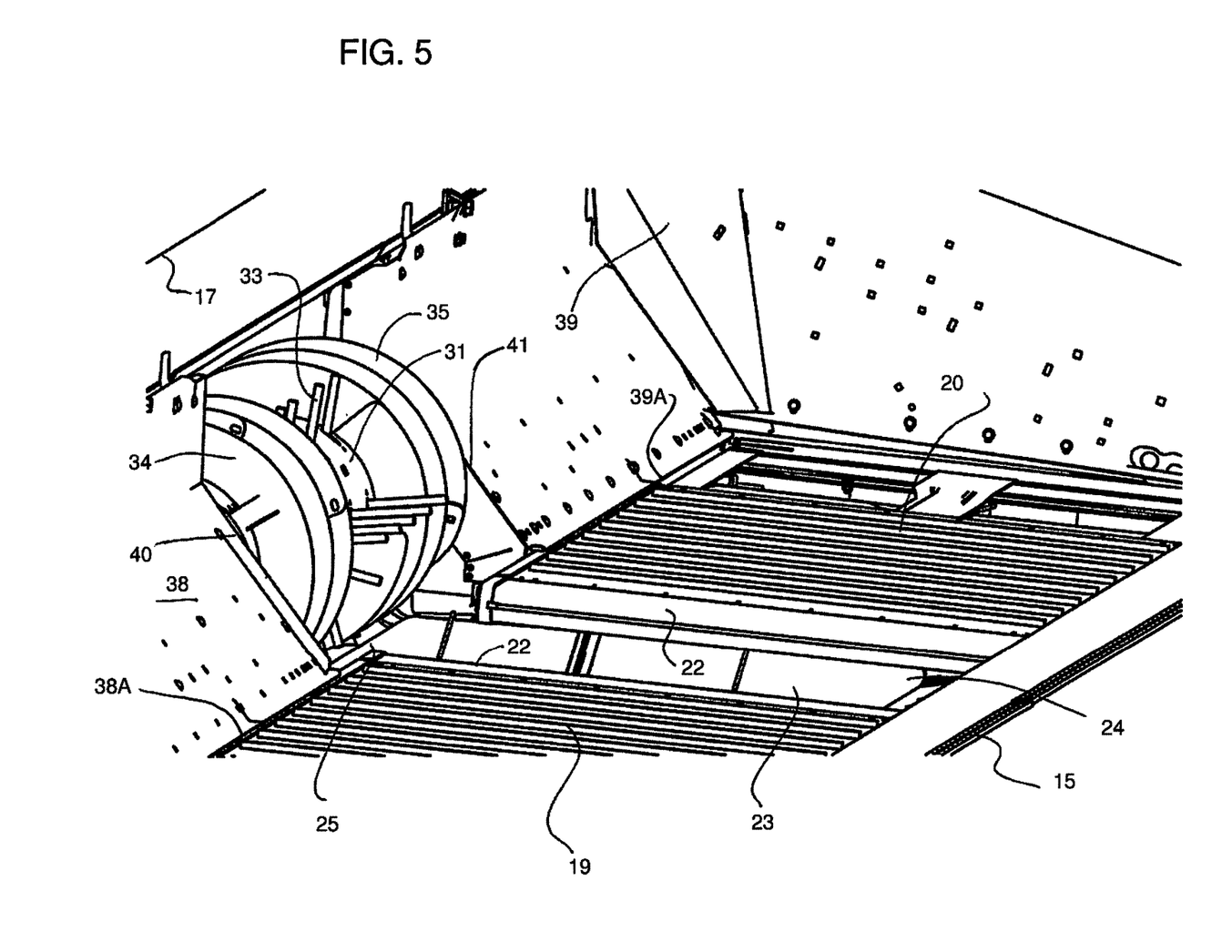
FIG. 5 is a second isometric view along the header of FIG. 1.

In this geometry as shown in FIG. 4, the inner end guide roller 22 of each side draper 19, 20 is located inwardly of the inner edge 40, 41 of the respective back sheet 38, 39 and inwardly of the outer ends 34A, 35A of the first auger flight portions 34 and 35.

In this geometry as shown in FIG. 3, a forward most tangent T2 to the flight portions 36, 37 lying in the common cylinder defined thereby is forward of the common back sheet plane defined by the back sheets 38, 39. Approximately the tangent T3 to the drum 31 is just behind the rear edges 20A of the side drapers 20 and 21 and the forward most tangent T2 can be forward of the rear edge 20A of the first and second side drapers. But more typically the tangent to the drum is behind the rear edge. Thus the flights 36, 37 are proud of the back sheets 38, 39 and act to grasp crop moving along the back sheets 38, 39 carried by the side drapers 20, 21 actively from the back sheets inwardly toward the feed opening. That is, it is important that tangent T2 is forward of the back sheet plane, but not necessarily forward of the rear edge 20A of the drapers 20, 21. In practice the tangent T2 is closer to vertically above rear edge 20A, where the tangent T3 to the drum 31 is about the depth of the flighting 37 behind the rear edge 20A.

The rear roller 25 of the feed draper 23 is behind at or slightly behind the rear edge 20A of the first and second side drapers 20, 21. However there is no necessity for the draper 23 to extend rearwardly to a position behind the rear edge 20A as the feeding action carries the material to the position underneath the roller 30 where the feeding action of the fingers acts to carry the material into the feed opening.

A conventional guide pan 50 is located underneath the roller 30 and extends to a rear end 50A at the bottom of the feed opening 17A to carry the crop over the pan 50 to the feed opening as the crop is driven rearwardly by the roller 30 and fingers 33.

The roller 30 therefore is located at a low height so that its bottom tangent T1 to the flights 37, 38 is below the height of the upper run of the side drapers 20, 21 so that the roller must be behind the side drapers and thus behind the back sheets. However the roller is as far forward as it can be located so that a tangent T2 to the flight portions is immediately adjacent the rear edge 20A of the side drapers.

The main drum 31 of the roller 30 is typically of a constant diameter about the roller axis but can have changes in diameter for example between the flight and finger sections. An exterior edge of the first and second auger flight portions 36, 37 preferably lies in an imaginary cylindrical surface surrounding the roller axis 32. However there may be changes in diameter for example if the flight tapers to a smaller diameter from an inner end 34B, 35B outwardly along the roller.

Figure 1:
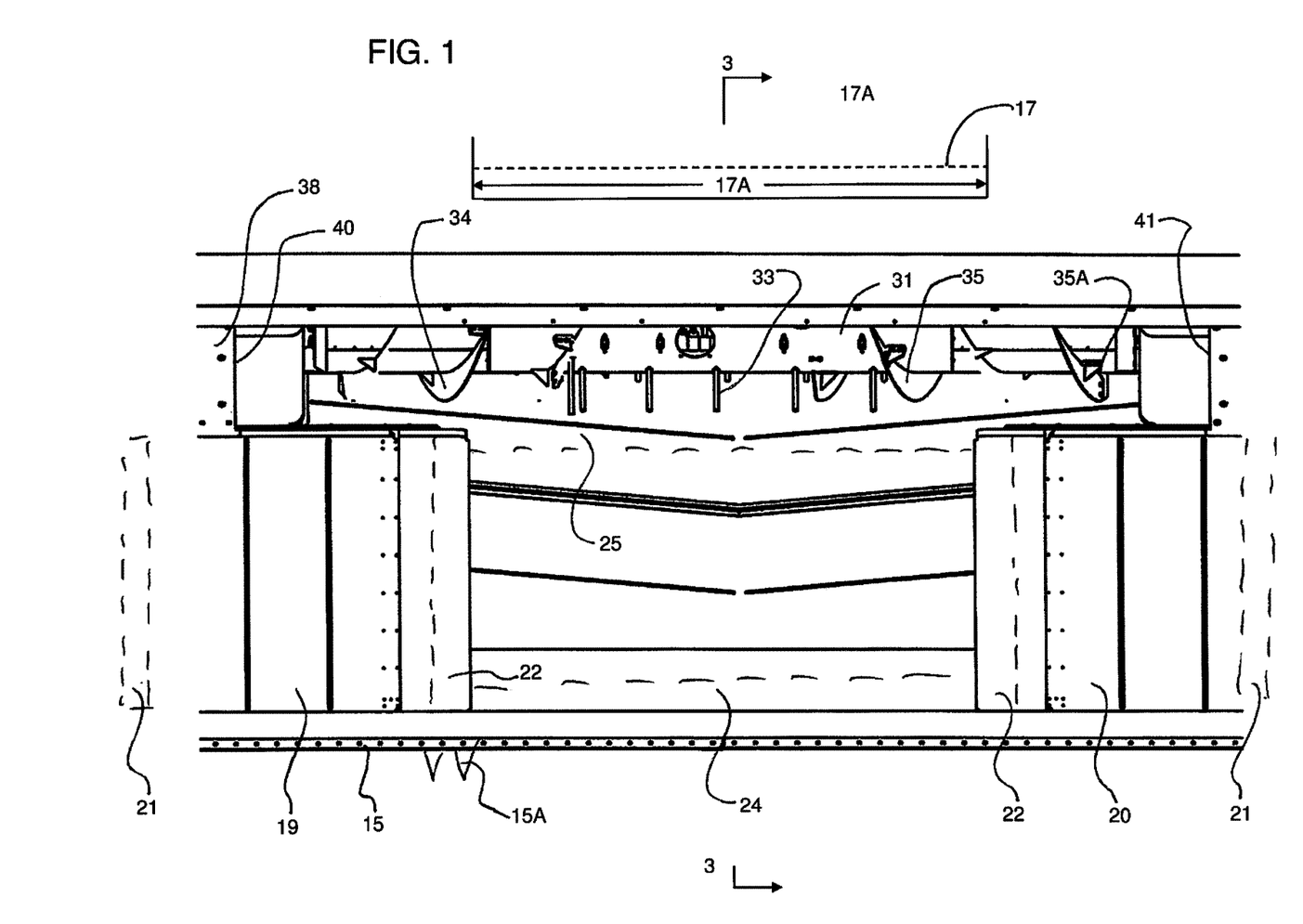
FIG. 1 is a top plan view of the center section only of a header according to the present invention with a number of elements such as the reel omitted for convenience of illustration.

The feed draper 23 has a width slightly larger than the space between the rollers 22 of the side drapers 20 and 21 and substantially equal to the width 17A of the feed opening as shown in FIG. 1 and the feed roller 30 including the first and second auger flight portions 34, 35 thereon is wider than the width 17A of the feed opening. This acts to provide an improved action on the crop pulling the crop inwardly from a wider width to the feed opening of the feeder house.

The invention claimed is:

1. A crop harvesting header for a harvester comprising:
a main frame structure extending between two ends of the header across a width of the header for movement in a direction generally at right angles to the width across ground including a crop to be harvested;
a mounting assembly for carrying the main frame structure on the harvester;
a cutter bar across a front of the main frame structure carrying a cutter knife operable for cutting the crop as the header is moved forwardly across the ground;
and a crop transport system for moving the cut crop toward a discharge location of the header for feeding the crop into a feed opening of the harvester;
the crop transport system including:
a first side draper having an outer end guide roller at a first end of the header, an inner end guide roller adjacent the discharge location and a draper canvas to define a top run of the canvas for carrying the cut crop from the cutter knife across the header to a discharge end adjacent the discharge location;
a second side draper having an outer end guide roller at a second end of the header, an inner end guide roller adjacent the discharge location and a draper canvas to define a top run of the canvas for carrying the cut crop from the cutter knife across the header to a discharge end adjacent the discharge location;
a feed draper located at the discharge location and including a front guide roller adjacent the cutter bar, a rear guide roller behind the front guide roller and a draper canvas wrapped around the front and rear guide rollers to define a top run of the feed draper for receiving the crop material from the discharge ends of the first and second side drapers and for carrying the crop material rearwardly toward the feed opening of the harvester;
each of the first and second side drapers having a front edge at the cutter bar and a rear edge;
and a feed roller having a main drum rotatable about a roller axis generally parallel to the cutter bar, the main drum including a finger section at a center portion adjacent the feed opening and first and second auger flight portions arranged on respective end portions of the main drum outwardly of the finger section;
the main frame structure including first and second back sheets each having a bottom edge at the rear edge of a respective one of the first and second side drapers, with each of the first and second back sheets extending upwardly and rearwardly from the bottom edge in a common back sheet plane;
the first and second back sheets each having an inner edge thereof spaced on each respective side of the feed opening, the inner edges are spaced apart and define an opening between the back sheets through which the crop passes to the feed opening of the harvester;

wherein the entire feed roller, including the finger section and the first and second auger flight portions, is positioned within the opening between the inner edges;

wherein a bottom tangent to the bottom of the flight portions has a position which is at a height below the rear edge of the side drapers;

wherein the roller axis of the feed roller is behind the rear edge of the side drapers and behind the back sheet;

wherein the inner end guide roller of the first side draper is located inwardly of the inner edge of the first back sheet and inwardly of an outer end of the first auger flight portion;

wherein the inner end guide roller of the second side draper is located inwardly of the inner edge of the second back sheet and inwardly of an outer end of the second auger flight portion;

and wherein a forward most tangent to the flight portions is forward of the common back sheet plane.

2. The header according to claim 1 wherein the forward most tangent to the flight portions is rearward of the rear edge of the first and second side drapers.

3. The header according to claim 1 wherein the rear roller of the feed draper is behind the rear edge of the first and second side drapers.

4. The header according to claim 1 wherein the rear roller of the feed draper is in a vertical plane close to or slightly in front of the roller axis.

5. The header according to claim 1 wherein a tangent to the flight portions is immediately adjacent the rear edge of the side drapers.

6. The header according to claim 1 wherein the main drum is coaxial about the roller axis.

7. The header according to claim 1 wherein the main drum is of a constant diameter about the roller axis.

8. The header according to claim 1 wherein an exterior edge of the first and second auger flight portions lie in an imaginary cylindrical surface surrounding the roller axis.

9. The header according to claim 1 wherein the feed draper has a width substantially equal to the width of the feed opening and the feed roller including the first and second auger flight portions thereon is wider than the feed opening.

* * * * *